United States Patent [19]

Tessmer

[11] 3,906,295
[45] Sept. 16, 1975

[54] SERVICE PEDESTAL FOR ELECTRICAL CONTROL MEANS INCLUDING A METER

[76] Inventor: Wallace David Tessmer, 9182 Rundelay Way, Sacramento, Calif. 95826

[22] Filed: Feb. 5, 1974

[21] Appl. No.: 439,958

[52] U.S. Cl................ 317/107; 312/214; 174/52 R; 317/120
[51] Int. Cl.².......................................... H02B 9/00
[58] Field of Search ........................... 317/104–107, 317/111, 120, 122, 112; 174/52 R, 52 S, 174/52 PE, DIG. 2; 312/214, 291, 296

[56] References Cited
UNITED STATES PATENTS

| | | | |
|---|---|---|---|
| 2,117,945 | 5/1938 | Cooper | 317/105 |
| 2,903,662 | 9/1959 | Harvey | 174/52 R |
| 2,976,098 | 3/1961 | Combs | 312/214 |
| 3,012,090 | 12/1961 | Robbins | 174/52 R |
| 3,197,545 | 7/1965 | Moore | 174/52 R |
| 3,305,287 | 2/1967 | Rait | 312/214 |
| 3,401,996 | 9/1968 | Rembold et al. | 312/296 |
| 3,450,951 | 6/1969 | Boyle | 317/105 |
| 3,675,085 | 7/1972 | Stanback | 317/120 |
| 3,691,288 | 9/1972 | Sturdivan | 174/52 R |
| 3,753,049 | 8/1973 | Plummer | 317/107 |

*Primary Examiner*—Gerald P. Tolin
*Attorney, Agent, or Firm*—Mark C. Jacobs

[57] ABSTRACT

Improvements in service pedestals for use with a light, such as a signal light or the like. The pedestal is adapted to be mounted on a supporting surface and includes at least a pair of side walls, a back wall, a top wall and a removable inner hinged door. The pedestal may include an outer door which seals off the interior of the pedestal from the environment. The pedestal further includes cable and utility wire clearance means in the form of a barrier dividing the interior of the pedestal into two sections, one being wider than the other, with the barrier providing means for bringing underground utility wires in the bottom thereof and permitting cables to operatively engage a control panel mounted on the back wall of the pedestal and bend along the barrier to the top wall of the pedestal. The pedestal may also include an upper section removably secured to the top wall with an opening therein for permitting the cables to be secured to a terminal box in the upper section. Knockout panels, transparent windows and openings may be provided on the pedestal so as to accommodate the pedestal to various operations and controls.

21 Claims, 7 Drawing Figures

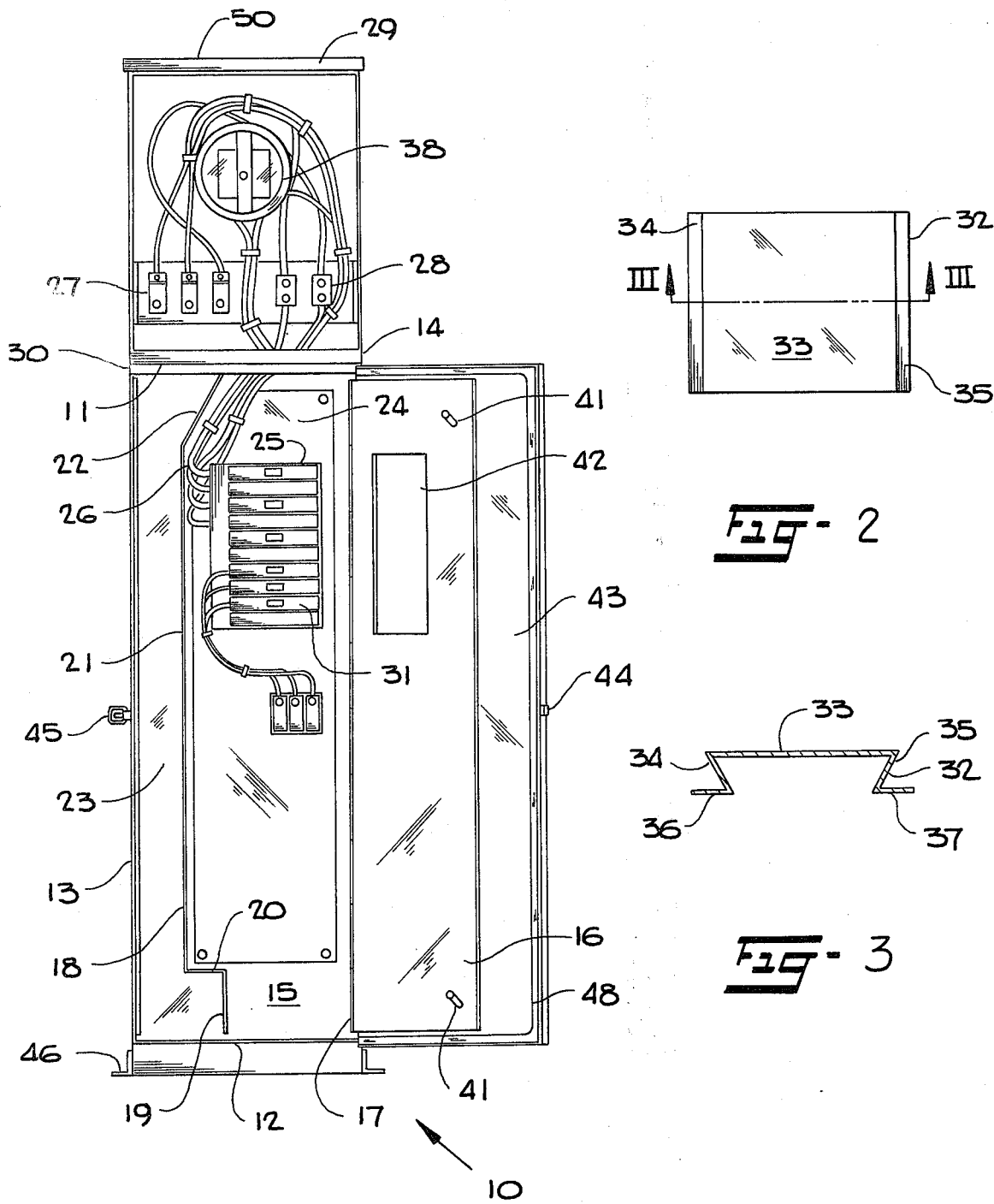

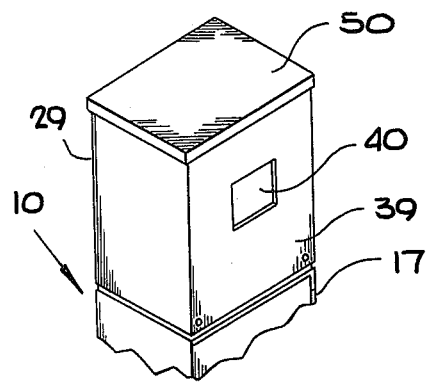
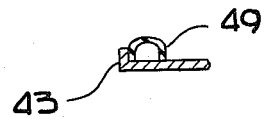
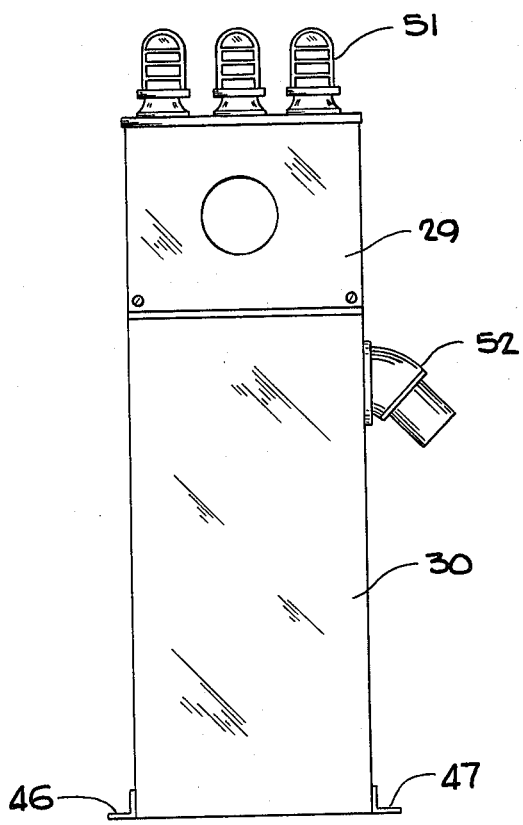
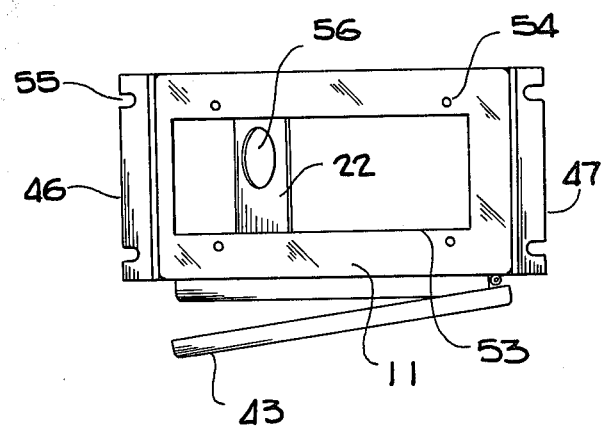

SERVICE PEDESTAL FOR ELECTRICAL CONTROL MEANS INCLUDING A METER

BACKGROUND OF THE INVENTION

1. FIELD OF THE INVENTION

The invention relates to service pedestals; and more particularly to improvements in service pedestals for use with signals and/or street lights or the like.

2. DESCRIPTION OF THE PRIOR ART

It is well known in the art to use service pedestals for leading wires or the like therein, then providing electrical connection between the pedestal and a light such as a signal or street light or the like. Certain prior art service pedestals are undesirable since the wires or the like are visible on the exterior thereof. Also, some prior art devices are aesthetically unpleasing yet, if made more compact in design, they would no longer be able to function as designed. It is also desirable that such safety pedestals, since they are installed outdoors, be essentially tamper-proof and vandal resistant. Not all prior art pedestals are so protected.

Further, it is desirable that such service pedestals be interchangeable in certain areas, for example, different voltages, circuit breakers, busses, etc., may be required. Such interchangeability should be able to be carried out at the service pedestal itself without the necessity of removing it from the field.

Finally, such a pedestal should include all of the foregoing features while combining metering and controls in an aesthetically pleasing modern design which blends in with existing utilities in areas where it is desired that all utilities be underground. Such a pedestal should be capable of combining a variety of metering, power distribution and control therefor. Finally, such a pedestal should be capable of underground service and flexibility so as to be able to accommodate future additions and changes.

SUMMARY OF THE INVENTION

It is an object of this invention to provide an improved service pedestal for a light or the like which is aesthetically appealing while retaining the ability to accommodate internally thereof cables or the like associated with the pedestal.

It is a further object of this invention to provide an improved service pedestal for a light or the like which combines a variety of metering, power distribution and control.

It is still another object of this invention to provide improvements in service pedestals wherein such a pedestal is smaller and more compact than prior art pedestals yet permits splitting metered and unmetered circuits.

It is still a further object of this invention to provide an improved service pedestal in which various parts thereof may be interchanged in the field and bussing in the pedestal becomes part of the circuit breakers associated therewith without the need for additional bracing.

These and other objects are preferably accomplished by pproviding at least a pair of side walls, a back wall, a top wall and a removable inner hinged door. The pedestal may include an outer door sealing off the interior of the pedestal from the environment. The pedestal further includes cable and utility wire clearance means in the form of a barrier dividing the interior thereof into a narrow section and a wider section. In this manner, underground utility wires may be brought into the bottom of the pedestal and cables may be connected to a control panel therein with the cables bending and brought upwardly to the top wall which may have an opening therein communicating with the interior of a removeablely enclosed upper section. This upper section may have a terminal box with landing lugs receiving the cables and various knockout panels, transparent windows and openings may be provided on the pedestal so as to accommodate various operations and controls.

BRIEF DESCRIPTION OF THE DRAWINGS

FIG. 1 is a vertical view of a service pedestal in accordance with the teachings of the invention;

FIG. 2 is a top plan view of a standoff which forms a part of the service pedestal of FIG. 1;

FIG. 3 is a cross-sectional view of the standoff of FIG. 2 taken along lines III—III thereof;

FIG. 4 is a perspective view of the top section alone of the pedestal of FIG. 1 showing a front panel installed thereon;

FIG. 5 is a cross-sectional view of a gasket installed on the outer door of the service pedestal of FIG. 1;

FIG. 6 is a vertical view of the service pedestal of FIG. 1 showing the outer door in closed position and various external apparatuses associated therewith; and FIG. 7 is a top plan view of the bottom section of the service pedestal of FIG. 1 prior to installing the top section thereon.

DESCRIPTION OF THE PREFERRED EMBODIMENT

Referring now to FIG. 1 of the drawing, a service pedestal 10 is shown comprised of a top wall 11, an upstanding bottom peripheral panel 12, elongated side walls 13 and 14, and a back wall 15 to form a service pedestal 10 which is completely enclosed at the front by an inner door 16. Door 16 may be hinged to side wall 13 by an elongated easily removable hinge 17, such as a piano hinge or the like. This hinge may run the entire length of side wall 13 as shown.

As particularly contemplated within the present invention, utility wires and cable clearance means are provided in pedestal 10 for conveying cables and underground utility wires or the like therethrough in a manner allowing proper clearance while permitting the cables to turn the corner. In the exemplary embodiment of the invention, such cable and utility wire clearance means includes a barrier 18 which may be mounted on back wall 15 having a first portion 19 extending upwardly generally normal to the surface on which pedestal 10 is installed, then includes a second portion 20 extending generally normal from first portion 19 to a point spaced from side wall 14, then includes a third portion 21 extending upwardly generally parallel to side wall 14. Barrier 18 further includes a fourth portion 22 angling inwardly from third portion 21 toward side wall 13 and up to a point adjacent top wall 11. It is not necessary that it actually engage wall 11. Also, for example, this angle may be about 30° from the vertical.

The barrier 18 thus divides the interior of pedestal 10 into two sections 23 and 24, one substantially wider than the other. The configuration of barrier 18 permits installation of a control panel 25 in wider section 24. That is, as can be seen in FIG. 1, control panel 25 fits in section 24 above second portion 20 of barrier 18 and below top wall 11. Also, the top barrier bend formed by the fourth angled portion 22 of barrier 18 allows proper clearance for cables 26 and assists the cables 26 in turning into a terminal box 27 mounted in a top section 29 of pedestal 10. Also as shown in FIG. 1, in an exemplary embodiment of the invention, the terminal ends of cables 26 plug into conventional line landing lugs 28 mounted in the terminal box 27. These lugs 28 may be aluminum bodied. Thus, the cables 26 do not plug directly into the meter 38 which is installed in pedestal 10 in top section 29. Meter 38 may be interchangeable from pedestal to pedestal.

The step at the bottom of pedestal 10 formed by the first and second portions 19 and 20, respectively, of barrier 18 allows adequate room for entry of the utility wires or lines from the concrete or other surface on which pedestal 10 is mounted while permitting attachment of these lines to a grounding collar or the like (not shown) and provide an adequate work area, e.g., about 5 inch in width. The first and second portions 19 and 20, respectively, of barrier 18 may be made removable from the elongated third portion 21 in any suitable manner, if desired, such as removable pins (not shown) or the like interconnecting portions 20 and 21. The sweeping effect provided by the bend in barrier 18 (i.e., portion 21) eliminates sharp corners that might get caught on the insulation of cables 26 if other configurations were used, such as those having bends or steps or the like.

Generally, cables 26 such are used in this type of pedestal may have a bend radius of about ten times the radius of the wire of the cable. As can be seen in FIG. 1, top section 29 is generally as wide as pedestal 10 to accommodate the terminal box 27.

Also as can be seen in FIG. 1, the bottom section 30 of pedestal 10 has a plurality of circuit breakers 31 installed therein and mounted on a standoff 32. As can be seen in FIGS. 2 and 3, standoff 32 is generally rectangular and includes a generally flat front portion 33, integral side walls 34 and 35 extending inwardly from the long sides of front portion 33 at an angle thereto and terminating in generally flat flanges 36, 37 integral with side walls 34, 35, respectively. Standoff 32 is generally open at each end and may include suitable apertures (not shown) for bolting standoff 32 to the back wall 15 in pedestal 10. It is to be understood that the overall height (FIG. 3) of standoff 32 may vary depending upon the voltage required to be carried by standoff 32. The inner door 16 may also be changed to accommodate a standoff greater in overall height. That is, a door with greater cutouts may be substituted for door 16 merely by removing piano hinge 17.

If pedestal 10 is to be used in nonmetered operation, top section 29 may be removed. That is, suitable means (not shown) may be provided for quickly and easily removing top section 29 from bottom section 30. In that case, cables 26 would go directly to the light or other fixture associated with pedestal 10.

As shown in FIG. 4, a removable panel 39 may be provided to enclose top section 29. This panel 39 may have a transparent window 40 or the like therein so as to be able to view the meter 38 therein without removing panel 39. Window 40 may be glass but is preferably of a suitable vandal-proof transparent material, such as polycarbonate plastic, which may be relatively thick, e.g., about ¼ inch thick.

Meter 38 may be any suitable type, such as a standard or demand meter, i.e., one which tells the maximum demand at any one time in addition to the total kilowatt hours used.

All the hinges on pedestal 10 may be interchangeable from one pedestal to the other. Conventional piano hinges are especially suited for this feature.

One or more of the panels forming the walls of pedestal 10 may be removable, welded in place, or removed entirely depending upon the use to which the pedestal 10 is put. Suitable transparent windows, similar to window 40, may be provided in one or more of these panels for permitting inspection of the interior thereof without the necessity of removing any panels or opening any doors. The pedestal 10 may be provided with optional knockouts in one or more of these panels for installation of such windows, if desired.

The inner door 16 may be closed and wired with a tamperproof seal to avoid access therein. Note that in FIG. 1, inner door 16 has suitable inner pivotal bars 41 or the like for locking door 16 from the exterior thereof. Also, door 16 has an elongated opening 42 for providing access to breakers 31 without the necessity of opening door 16.

An outer door 43 is also provided and hinged as door 16 to side wall 14. This door 43 completely encloses inner door 16 and the open front of the bottom section 30 of pedestal 10. The top section 29 does not require a double-door construction. A suitable lock portion 44 may be provided on outer door 43 adapted to releasably lockingly engage a mating releasable lock portion 45 on side wall 13.

Pedestal 10 may be mounted to its supporting surface in any suitable manner. For example, a pair of peripheral flanges 46, 47 may be either integral with side walls 13, 14, respectively, and extending beyond side walls 13, 14 or otherwise connected thereto. Suitable apertures or elongated slots 55 may be provided in flanges 46, 47 for connecting pedestal 10 to a concrete pad or the like by suitable nuts and bolts cemented into the pad. The utility lines for pedestal 10 may be fed in through the bottom of pedestal 10 which may include either suitable apertures therefor or be removed entirely. Of course, pedestal 10 may have a bottom wall (not shown) with suitable apertures for passing the lines therethrough.

It can be seen that underground utilities may be quickly and easily connected to pedestal 10 without any cables or lines being visible from the exterior thereof. The various internal arrangements of components, including barrier 18, may be varied depending upon the access area available. For example, a mirror image of pedestal 10 would be within the purview of the invention.

Referring once again to FIG. 1, the entire inner peripheral portion of outer door 43 may be provided with suitable insulation means, such as a gasket 48 of insulating material, to seal dust and moisture from the interior of pedestal 10. Optionally, a U-shaped channel-type insulation may be used since such insulation provides a tighter fit. For example, as shown in FIG. 5, a U-shaped insulating gasket 49 may be fixedly secured to door 43 and may be of suitable insulating material, such as skinned urethane foam.

In an examplary embodiment of the invention, pedestal 10 may be provided with one or more knockout panels for connecting various externally mounted apparatuses thereto. For example, the top wall 50 of top section 29 may have removable knockout panels for receiving lamps 51 therein. Also, sidewall 14 may have a like panel for receiving an external apparatus 53 therein. Of course, these panels may be at any suitable location on pedestal 10 and electrical connection is internally provided between these external mounted apparatuses. [See FIG. 6]

Although pedestal 10 in FIG. 1 is shown as having a top and bottom section 29 and 30, respectively, as discussed hereinabove and as shown in FIG. 7, top wall 11 of lower or bottom section 30 may have a suitable opening 53 therein, e.g., generally rectangular, for providing access to top section 29. If top section 29 is not used, a suitable generally flat and imperforate panel (not shown) may be bolted or otherwise secured using apertures 54, to close off the opening 53. It can also be seen in FIG. 7 that the fourth portion 22 of barrier 18 may also have an opening 56 therein for accommodating pedestal 10 to various controls. Pedestal 10 may be provided with various components, such as motor starters, control systems, time delay relays, elapsed time meters, time clocks, alarm lights, battery chargers, batteries, space heaters, level controls and gauges, etc. Pedestals 10 may be metered, unmetered or double metered or any combination thereof.

Lock portions 44, 45 may be releasably padlocked together. The panels comprising pedestal 10 may be of any suitable material, such as 12 gauge galvanized steel, treated with a vinyl wash, galvanoleum primer and coataed with one or more coats of enamel. Of course, other known techniques may be used.

It can be seen from the foregoing that a service pedestal has been described that is completely weatherproof and dust-tight and combines metering and control in a neat, relatively compact structure which blends in with an underground utility environment. The pedestal is extremely flexible and able to accommodate a variety of metering, power distribution and control. Further, changes may be easily made thereto to accommodate additions or modifications in the future.

I claim as my invention:

1. A service pedestal for an electrical control system or the like wherein the pedestal is adapted to be mounted on a supporting surface and said pedestal has a pair of upstanding elongated side walls, a back wall interconnecting the side walls and back wall and top and bottom walls interconnected thereto, the improvement which comrpises:

a. A selectively closable inner door, having at least one opening extending therethrough, hingedly connected to one of said side walls and forming a cabinet having an interior chamber completely sealed off from the environment when said inner door is in closed position, said hinge being removable,
   b. cable and utility wire clearance means mounted in the interior chamber dividing said chamber into two sections, a narrow section and a water section, said cable and utility wire clearance means including a barrier having a first portion extending upwardly within said chamber from the bottom thereof generally parallel to the plane of one of said side walls and spaced therefrom, then includes a second portion integral with said first portion extending toward said one of said side walls and spaced therefrom, generally normal to said first portion and generally parallel to the surface on which said pedestal would be mounted, when said pedestal is mounted on a surface, then includes a third portion connected to said second portion extending upwardly within said chamber generally parallel to the plane of said one of said side walls but spaced from said one of said side walls, then includes a fourth portion integral with said third portion extending inwardly toward the central longitudinal axis of said chamber at an angle from the vertical and toward said top wall, said third portion being relatively longer than both said first and fourth portions, the spacing between said third portion and said one of said side walls being substantially less than the spacing between said third portion and the other of said side walls,
   c. a selectively closable outer door hingedly connected to one of said side walls and completely sealing off both sections of said chamber and said first mentioned inner door when the outer door is in closed position.

2. In the pedestal of claim 1 wherein said inner door is hingedly connected to said one of said side walls by a hinge having a removable portion thereof so that said door is removable from said pedestal.

3. In the pedestal of claim 1 wherein said fourth portion of said barrier extends at an angle of about 30° from the vertical.

4. In the pedestal of claim 1 wherein sealing means are provided about substantially the entire inner periphery of said outer door.

5. In the pedestal of claim 1 wherein said second portion of said barrier is removably connected to said third portion.

6. In the pedestal of claim 1 wherein a standoff is mounted on said back wall in the wider section of said chamber, said standoff having a plurality of circuit breakers mounted thereon and including a pair of generally flat flanges removably secured to said back wall, a pair of side members integral with each of said flanges, said side members extending in a direction toward the respective side walls of said pedestal, and a generally flat plate integrally connected to said side members, said circuit breakers being mounted on said plate.

7. In the pedestal of claim 1 wherein one or more of said walls includes knockout panels therein.

8. In the pedestal of claim 1 wherein flange members extend generally horizontal from the lowermost portions of each of said side walls and integral therewith, said flange members having a plurality of apertures therein for securing said flange members to said supporting surface.

9. In the pedestal of claim 1 further including:
   d. electrical control means mounted in the wider section of said pedestal, said means including a plurality of flexible cables operatively connected thereto.

10. In the pedestal of claim 9 wherein said inner door includes at least one additional opening extending therethrough.

11. The pedestal of claim 9 wherein the electrical control means include manually operable control means, and said inner door includes an opening therein generally aligned with said manually operable control means whereby said control means can be operated without the necessity of opening the inner door.

12. The pedestal of claim 1 wherein said side walls, back wall, and top wall and door comprise a lower section of said pedestal and said top wall includes an opening therein and an upper section removably connected to said top wall also having a pair of side walls, a back wall interconnected to said last-mentioned side walls, a top wall interconnecting said last-mentioned side walls and back wall, and a removable front wall completely closing off the interior of said upper section, the side walls, front wall and back wall of said upper section being generally co-planar with the respective side walls, door and back wall of said lower section, and the opening in the top wall of said lower section communicating with the interior of said upper section.

13. In the pedestal of claim 12 wherein one or more of said walls includes knockout panels therein.

14. The pedestal of claim 12 further including electrical control means mounted in the lower section of the pedestal, in the wider section thereof, said control means including a plurality of flexible cables operatively connected thereto.

15. The pedestal of claim 14 wherein the electrical control means include manually operable control menas, and the inner door of the lower section of the pedestal includes an opening therein generally aligned with said manually operable control means whereby said control means can be operated without the necessity of opening the inner door.

16. The pedestal of claim 12 wherein a plurality of landing lugs are mounted on a terminal box installed in the interior of said upper section.

17. In the pedestal of claim 12 wherein said terminal box includes a meter removably and operatively connected therein.

18. In the pedestal of claim 17 wherein said front wall of said upper section includes a transparent window therein generally aligned with said meter for reading said meter without the necessity of removing said front wall of said upper section.

19. A service pedestal for an electrical distribution system wherein the pedestal has a pair of upstanding elongated side walls a back wall interconnecting the side walls and a top wall interconnecting the side walls and the top wall, the improvement which comprises:

a. a two section pedestal wherein said side walls, back wall and top wall comprise a lower section of said pedestal and said top wall includes an opening therein; and an upper section removably connected to said top wall of the lower section, said upper section also having a pair of side walls, a back wall interconnected to said last-mentioned side walls, a top wall interconnecting said last mentioned side walls and back wall, and a removable front wall which completely closes off the interior of said upper section, wherein the lower section has a selectively closable outer door bearing an optional lock mechanism, and is hingedly connected to one of the side walls of the lower section thereby forming a cabinet having an interior chamber when the outer door is in a closed position; the side walls, back wall and outer door being generally co-planar to the respective side walls, back wall and front wall of the upper section, and the opening in the top wall of said lower section communicating with the interior of the said upper section, wherein flange members extend generally horizontally from the lowermost portions of each of said side walls and integral therewith, said flange members having a plurality of apertures therein for securing said flange members to a supporting surface, said lower section having a selectively closable inner door having at least one opening extending therethrough, hingedly connected to one of said lower section side walls, said inner door being interposed behind the outer door and being sealed off from the enviroment by the outer door, the hinged connection for said inner door being removeable, cable and utility wire clearance means mounted in the interior chamber dividing said chamber into two sections, a narrow section and a wider section, said calbe and utility wire clearance means including a barrier having a first portion extending upwardly within said chamber from the bottom thereof generally parallel to the plane of one of said side walls and spaced therefrom, then including a second portion integral with said first portion extending toward said one of said side walls and spaced therefrom, generally normal to said first portion and generally parallel to the surface on which said pedestal would be mounted, when said pedestal is mounted on a surface, then includes a third portion connected to said second portion extending upwardly within said chamber generally parallel to the plane of said one of said side walls but spaced from said one of said side walls, then includes a fourth portion integral with said third portion extending inwardly toward the central longitudinal axis of said chamber at an angle from the vertical and toward said top wall, said third portion being relatively longer than both said first and fourth portions, the spacing between said third portion and one of said side walls being substantially less than the spacing between said third portion and the other of said side walls.

20. The pedestal of claim 19 further including electrical control means mounted in the wider section of the lower section of the pedestal, said means including a plurality of flexible cables operatively connected thereto, said cables extending through the opening of the top portion of the lower section and into operative engagement with a plurality of landing lugs mounted in the interior of the upper section on a terminal box installed therein, and said terminal box includes a meter removably and operatively connected therein, and wherein the electrical control means include manually operable control means and said inner door includes an opening therein generally aligned with said manually operable means whereby said manually operable means can be operated without the necessity of opening the inner door.

21. In the pedestal of claim 20 wherein the manually operable control means comprise at least one circuit breaker, and the front wall of the upper section includes a transparent window therein generally aligned with the said meter for reading same.

* * * * *